(12) United States Patent
Cheng et al.

(10) Patent No.: US 8,693,967 B2
(45) Date of Patent: Apr. 8, 2014

(54) RECEIVER CAPABLE OF CONCURRENTLY COLLECTING DUAL BAND SIGNALS, AND METHOD THEREOF

(75) Inventors: Chi-Wei Cheng, Taipei (TW); Yueh-Hua Yu, New Taipei (TW); Yi-Jan Chen, Taipei (TW)

(73) Assignees: Mediatek Inc., Science-Based Industrial Park, Hsin-Chu (TW); National Taiwan University, Taipei (TW)

( * ) Notice: Subject to any disclaimer, the term of this patent is extended or adjusted under 35 U.S.C. 154(b) by 368 days.

(21) Appl. No.: 13/073,996

(22) Filed: Mar. 28, 2011

(65) Prior Publication Data

US 2012/0252395 A1    Oct. 4, 2012

(51) Int. Cl.
*H04B 1/18*    (2006.01)

(52) U.S. Cl.
USPC ........... 455/176.1; 455/182.1; 455/183.1; 455/183.2; 455/188.1

(58) Field of Classification Search
USPC ........ 455/176.1, 182.1, 183.1, 183.2, 130, 455/150.1, 151.1, 168.1, 179.1, 180.1, 455/184.1, 189.1, 190.1, 192.1; 342/357.76
See application file for complete search history.

(56) References Cited

U.S. PATENT DOCUMENTS

| | | | |
|---|---|---|---|
| 6,856,794 B1 | 2/2005 | Tso | |
| 7,130,599 B2 | 10/2006 | Persico | |
| 8,120,531 B2* | 2/2012 | Yang et al. | 342/357.76 |
| 2006/0262230 A1* | 11/2006 | Ookubo et al. | 348/731 |
| 2009/0160704 A1 | 6/2009 | Zhao | |
| 2009/0189808 A1 | 7/2009 | Chen | |
| 2010/0141519 A1* | 6/2010 | Rodal | 342/357.12 |
| 2011/0122974 A1* | 5/2011 | Sundstrom et al. | 375/316 |
| 2012/0194384 A1* | 8/2012 | Reis et al. | 342/357.77 |
| 2013/0039444 A1* | 2/2013 | Porret et al. | 375/316 |
| 2013/0155748 A1* | 6/2013 | Sundstr m et al. | 363/157 |

OTHER PUBLICATIONS

Roman Kuc, "Introduction to Digital Signal Processing", 2008 reprint of 1982 original, cover page+ p. 102-103, BS Publications.
[Farbod Behbahani, Yoji Kishigami, John Leete and Asad A. Abidi], [CMOS mixers and polyphase filters for large image rejection], [Jun. 2001], [873-887], [vol. 36 No. 6], [IEEE Journal].
[Yoshihiro Utsurogi, Masaki Haruoka, Toshimasa Matsuoka, Kenji Taniguchi], [CMOS Front-End Circuits of Dual-Band GPS Receiver], [Jun. 2005], [1275-1279(2005)], [vol. E88-C No. 6], [IEICE], [Japan].

* cited by examiner

*Primary Examiner* — Pablo Tran
(74) *Attorney, Agent, or Firm* — Winston Hsu; Scott Margo

(57) ABSTRACT

A receiver of a GNSS system is provided. The receiver comprises two mixers and a processing circuit. The first mixer down-converts an input radio-frequency signal comprising a first GNSS signal and a second GNSS signal into a first low-frequency signal. The second mixer down-converts the input radio-frequency signal into a second low-frequency signal. The processing circuit generates at least one phase-shifted low-frequency signal according to at least the first low-frequency signal, extract signal components of the first GNSS signal by rejecting signal components of the second GNSS signal according to the second low-frequency signal and the at least one phase-shifted low-frequency signal, and extract signal components of the second GNSS signal by rejecting signal components of the first GNSS signal according to the second low-frequency signal and the at least one phase-shifted low-frequency signal. The first and second GNSS signals are situated in different frequency ranges.

6 Claims, 9 Drawing Sheets

RECEIVER CAPABLE OF CONCURRENTLY COLLECTING DUAL BAND SIGNALS, AND METHOD THEREOF

BACKGROUND

The present invention relates to a receiving scheme, and more particularly to a front-end circuit configured within a receiver for collecting signals of multiple different communication systems.

A conventional GNSS receiver may support multiple GNSS services, such as GPS and GLONASS, but it is impossible for such GNSS receiver to receive/collect multiple kinds of GNSS signals at the same time. For example, the conventional GNSS receiver collects one GPS Layer 1 band signal and one GLONASS Layer 1 band signal separately. That is, the conventional GNSS receiver cannot successfully collect GPS and GLONASS data within one signal reception operation. Since the conventional GNSS receiver having only one set of receiving circuits cannot receive GPS and GLONASS data simultaneously, one way to solve this problem is to configure two sets of GNSS receiving circuits within one GNSS receiver. However, using two sets of receiving circuits introduces circuit cost and increases circuit size.

SUMMARY

It is therefore one objective of the present invention to provide a receiver that is capable of concurrently receiving/collecting signals of multiple different communication systems in one signal reception mode/operation. Such receiver can be implemented in global navigation satellite system (GNSS), Global System for Mobile Communications (GSM), Code Division Multiple Access (CDMA) systems, etc. in order to decrease circuit cost.

According to one embodiment of the present invention, a receiver for receiving a first communication signal while being receiving a second communication signal is provided. The receiver comprises a first mixer, a second mixer, and a processing circuit. The first mixer is utilized for down-converting an input radio-frequency signal comprising the first communication signal and the second communication signal into a first low-frequency signal according to a first local oscillating signal. The second mixer is utilized for down-converting the input radio-frequency signal into a second low-frequency signal according to a second local oscillating signal. The processing circuit is utilized for generating at least one phase-shifted low-frequency signal according to at least the first low-frequency signal, extracting signal components of the first communication signal by rejecting signal component of the second communication signal according to the second low-frequency signal and the at least one phase-shifted low-frequency signal, and extracting signal components of the second communication signal by rejecting signal component of the first communication signal according to the second low-frequency signal and the at least one phase-shifted low-frequency signal. The first communication signal is situated in a first frequency range different from a second frequency range in which the second communication signal is situated.

According to an embodiment of the present invention, a method for receiving a first communication signal while being receiving a second communication signal is disclosed. The method comprises: down-converting an input radio-frequency signal comprising the first communication signal and the second communication signal into a first low-frequency signal according to a first local oscillating signal; down-converting the input radio-frequency signal into a second low-frequency signal according to a second local oscillating signal; generating at least one phase-shifted low-frequency signal according to at least the first low-frequency signal; extracting signal components of the first communication signal by rejecting signal component of the second communication signal according to the second low-frequency signal and the at least one phase-shifted low-frequency signal; and extracting signal components of the second communication signal by rejecting signal component of the first communication signal according to the second low-frequency signal and the at least one phase-shifted low-frequency signal. The first communication signal is situated in a first frequency range different from a second frequency range in which the second communication signal is situated.

According to one embodiment of the present invention, a receiver for receiving a first communication signal and a second communication signal is provided. The receiver comprises a first mixer for down-converting an input radio-frequency signal comprising the first communication signal and the second communication signal into a first low-frequency signal according to a first local oscillating signal, a second mixer for down-converting the input radio-frequency signal into a second low-frequency signal according to a second local oscillating signal, and a polyphase filter for extracting signal components of the first communication signal by rejecting signal components of the second communication signal according to the first and second low-frequency signals. The first communication signal is situated in a first frequency range different from a second frequency range in which the second communication signal is situated.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
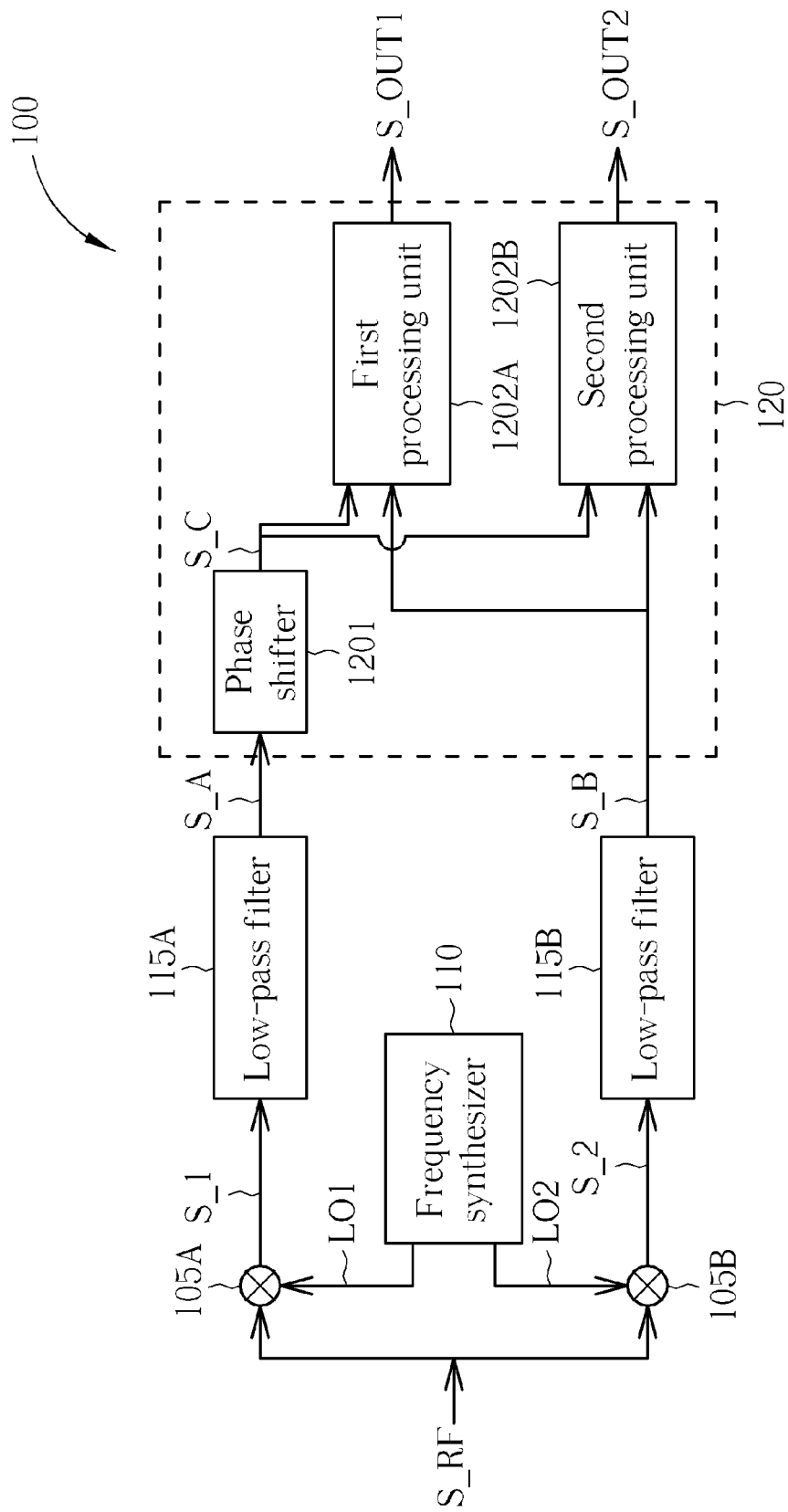
FIG. 1 is a block diagram of a receiver according to a first embodiment of the present invention.

Please refer to FIG. 1, which illustrates a block diagram of a receiver 100 capable of receiving signals of multiple communication systems according to a first embodiment of the present invention. The communication systems may include global navigation satellite systems (GNSS), Global System for Mobile Communications (GSM). The global navigation satellite system may be the Global Positioning System (GPS), GLONASS, Galileo, COMPASS, or other regional navigation system, e.g. Beidou or DORIS. Specifically, the receiver 100 comprises mixers 105A-105B, a frequency synthesizer 110, low-pass filters 115A-115B, and a processing circuit 120. The processing circuit 120 comprises a phase shifter 1201, a first processing unit 1202A, and a second processing unit 1202B. The frequency synthesizer 110 is coupled to the mixers 105A-105B, and is utilized for generating a first oscillating signal LO1 and a second oscillating signal LO2. The first oscillating signal LO1 is substantially orthogonal to the second oscillating signal LO2. In detail, the first oscillating signal LO1 may be a sine wave $\sin \omega_{LO} t$, and the second oscillating signal LO2 may be a cosine wave $\cos \omega_{LO} t$. The frequencies $\omega_{LO}$ of the first and second local oscillating signal LO1 and LO2 correspond to the oscillating frequency outputted by the frequency synthesizer 110. The mixers 105A-105B are arranged to respectively receive the input radio-frequency (RF) signal S_RF and respectively down-convert the input RF signal S_RF into the first and second low-frequency signals S_1 and S_2 according to the first and second oscillating signals LO1 and LO2. Please note that the first and second low-frequency signals S_1 and S_2 are indicative of signals having frequencies lower than that of the input RF signal S_RF. That is, the first and second low-frequency signals S_1 and S_2 can be intermediate frequency signals or extremely low frequency signals. The name 'low-frequency' is merely used to explain that the signals S_1 and S_2 are frequency-converted signals from the signal S_RF having a higher frequency. This is not meant to be a limitation of the present invention.

The first and second low-frequency signals S_1 and S_2 then pass through the low-pass filters 115A-115B, and high-frequency signal components are eliminated leaving only signal components having lower frequencies. The low-pass filters 115A-115B are optional circuit elements, and configuration of any low-pass filter into the receiver 100 may be not required in another embodiment. This also follows the spirit of the present invention. The low-pass filters 115A-115B generate filtered signals S_A and S_B that are respectively transmitted to the processing circuit 120. The filtered signal S_A is transmitted to the phase shifter 1201, and the filtered signal S_B is transmitted directly to both the first and second processing unit 1202A-1202B. The phase shifter 1201 is arranged to shift the phase of the filtered signal S_A by 90 degrees to generate the phase shifted signal S_C, which is transmitted to the first and second processing unit 1202A-1202B. In this embodiment, the first processing unit 1202A is used as an adder for adding signal components of the phase shifted signal S_C to those of the filtered signal S_B to generate the output signal S_OUT1. The second processing unit 1202B is used as a subtraction unit for subtracting signal components of the phase shifted signal S_C from those of the filtered signal S_B to generate the output signal S_OUT2.

Figure 2:
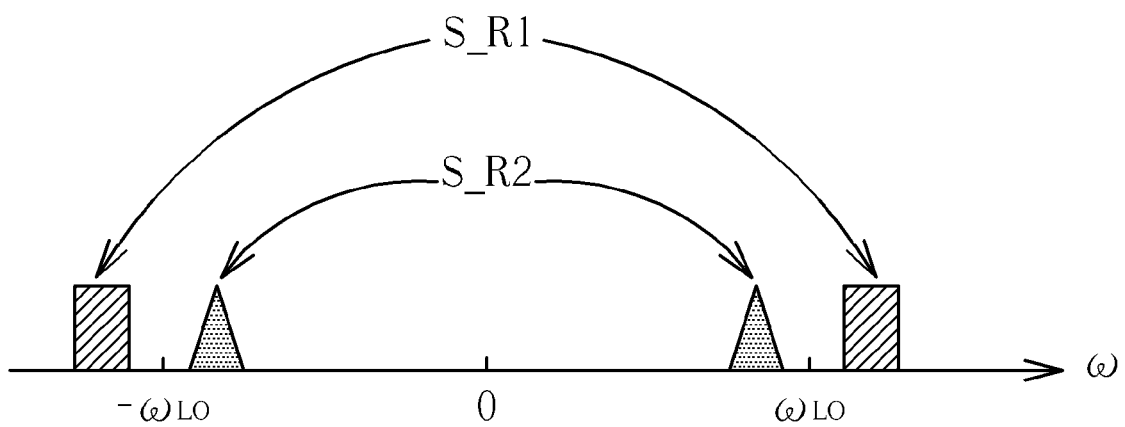
FIG. 2 is a diagram showing frequency spectra components of the input RF signal S_RF as shown in FIG. 1.

In the following description, GPS and GLONASS systems are taken as examples. However, the examples are merely used for illustrative purposes, and are not meant to be limitations of the present invention. Please refer to FIG. 2, which illustrates a diagram showing frequency spectra components of the input RF signal S_RF as shown in FIG. 1. The abscissa is indicative of frequency values. A frequency range on the abscissa indicated by S_R1 represented by two rectangles filled with solid lines is a first frequency range, such as the frequency range of the GLONASS signal, and the first frequency range is comprised by the positive and negative frequency components of the GLONASS signal. A frequency range on the abscissa indicated by S_R2 represented by two triangles filled with dots is a second frequency range, such as the frequency range of the GPS signal, and the second frequency range is comprised by the positive and negative frequency components of the GPS signal. The frequency $\omega_{LO}$ is the oscillation frequency provided by the frequency synthesizer 110. In this example, the frequency $\omega_{LO}$ is between the first and second frequency ranges. The choice of the frequency $\omega_{LO}$ is not meant to be a limitation of the present invention. For receiving the GLONASS signal represented by the first frequency range S_R1, the GPS signal represented by the second frequency range S_R2 is regarded as an unwanted/undesired signal. Instead, for receiving the GPS signal represented by the second frequency range S_R2, the GLONASS signal represented by the first frequency range S_R1 is regarded as an unwanted/undesired signal. The receiver 100 of this embodiment is capable of separately receiving/collecting the GPS and GLONASS signals in one satellite signal reception mode/operation.

Figure 3:
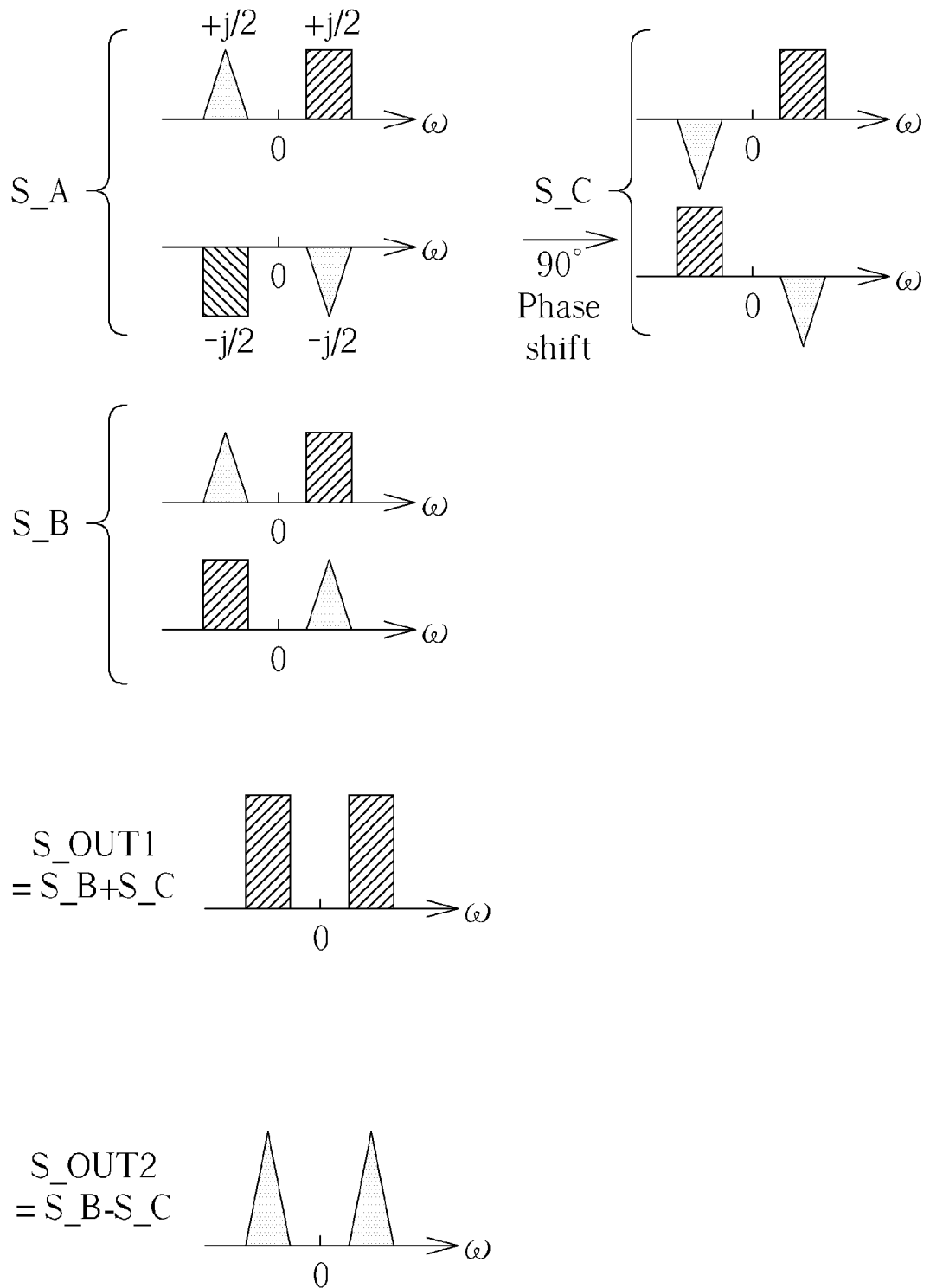
FIG. 3 is a diagram showing Fourier spectrums plots of the signals S_A, S_B, S_C, S_OUT1, and S_OUT2 as shown in FIG. 1.

Please refer to FIG. 3 in conjunction with FIG. 1. FIG. 3 illustrates a diagram showing Fourier spectrum plots of the signals S_A, S_B, S_C, S_OUT1, and S_OUT2 as shown in FIG. 1. As shown in FIG. 3, after the processing of the mixer 105A and the LPF 115A, a low-frequency signal such as the signal S_A comprising the GPS and GLONASS signals is generated. It should be noted that the signal S_A is represented by two-part signals for illustrative purposes. However, this is not meant to be a limitation of the present invention. Similarly, after the processing of the mixer 105B and the LPF 115B, a low-frequency signal, such as the signal S_B comprising the GPS and GLONASS signals, is generated. For separating the GPS signal from the GLONASS signal, the first step is to perform a 90 degree phase shifting operation on one of the signals S_A and S_B. In this embodiment, the phase shifter 1201 is arranged to perform the 90 degree phase shifting operation on the signal S_A to generate the signal S_C. The phase-shifted signal S_C is also comprised by the GPS and GLONASS signals. One difference between the signals S_A and S_C is that the Fourier spectrums of the negative components of the GLONASS/GPS signals comprised by the signal S_C are different from those comprised by the signal S_A. The negative values of the Fourier spectrum of the former frequency components become positive, and the positive values of the Fourier spectrum of the latter frequency components become negative.

The second step for generating the GLONASS signal is to add the signals S_B and S_C. As shown in FIG. 3, the phase-shifted signal S_C comprises the GLONASS signal including the Fourier spectrum components having positive values and the GPS signal including the Fourier spectrum components having negative values. The signal S_B comprises the GLONASS signal including the Fourier spectrum components having positive values and the GPS signal including the Fourier spectrum components having positive values. The first processing unit 1202A, which is used as an adder, is utilized for adding signal components of the phase shifted signal S_C to those of the filtered signal S_B to generate the output signal S_OUT1. Therefore, by signal summation, the output signal S_OUT1 is generated by adding all the Fourier spectrum components of the filtered signal S_B to those of the phase shifted signal S_C. The Fourier spectrum components of the GPS signal included within the signal S_B neutralize the Fourier spectrum components of the GPS signal included within the signal S_C. The remaining Fourier spectrum components in the signal summation result (i.e. the output signal S_OUT1) are all associated with the GLONASS signal. Thus, the output signal S_OUT1 can be used for retrieving GLONASS data. For generating the GPS signal, the second processing unit 1202B is arranged to subtract signal components of the phase shifted signal S_C from those of the filtered signal S_B to generate the output signal S_OUT2. By signal subtraction, the output signal S_OUT2 is generated by subtracting all the Fourier spectrum components of the phase shifted signal S_C from those of the filtered signal S_B. The Fourier spectrum components of the GLONASS signal included within the signal S_B neutralize the Fourier spectrum components of the GLONASS signal included within the signal S_C. The remaining Fourier spectrum components in the signal subtraction result (i.e. the output signal S_OUT2) are all associated with the GPS signal. Thus, the output signal S_OUT2 can be used for retrieving GPS data.

For GPS signal reception, the GLONASS signal is regarded as an image signal of the GPS signal. For GLONASS signal reception, the GPS signal is regarded as an image signal of the GLONASS signal. Therefore, by phase shifting and signal calculation (summation or subtraction) for rejecting image signals, the receiver 100 of this embodiment is capable of rejecting the GLONASS signal and extracting the GPS signal from the received RF signal, and capable of rejecting the GPS signal and extracting the GLONASS signal from the received RF signal. Similarly, by regarding the GSM 900 MHz signal as an image signal of the GSM 1800 MHz signal and regarding the GSM 1800 MHz signal as an image signal of the GSM 900 MHz signal, the receiver 100 can be used to collect both the GSM 900 and 1800 MHz signals at the same time. The frequency synthesizer 110 generates a first oscillating signal LO1 and a second oscillating signal LO2 substantially orthogonal to each other, wherein the frequency $\omega_{LO}$ of the first and second local oscillating signals LO1 and LO2 is substantially at the center of the two frequency ranges of the 900 and 1800 MHz signals. The mixers 105A-105B receive the input RF signal S_RF and respectively down-convert the input RF signal S_RF into the first and second low-frequency signals S_1 and S_2 according to the first and second oscillating signals LO1 and LO2. The first and second low-frequency signals S_1 and S_2 may be down-converted by mixers (not shown in the figure) again for ease of following processing. The first and second low-frequency signals S_1 and S_2 then pass through the low-pass filters 115A-115B, and high-frequency signal components are eliminated leaving only signal components having lower frequencies. Please be noted that the low-pass filters 115A-115B are optional circuit elements. The filtered signal S_A is then transmitted to the phase shifter 1201, and the filtered signal S_B is transmitted directly to both the first and second processing unit 1202A-1202B. The phase shifter 1201 is arranged to shift the phase of the filtered signal S_A by 90 degrees to generate the phase shifted signal S_C, which is transmitted to the first and second processing unit 1202A-1202B. In this embodiment, the first processing unit 1202A is used as an adder for adding signal components of the phase shifted signal S_C to those of the filtered signal S_B to generate the output signal S_OUT1 (e.g. the GSM 900 MHz signal). The second processing unit 1202B is used as a subtraction unit for subtracting signal components of the phase shifted signal S_C from those of the filtered signal S_B to generate the output signal S_OUT2 (e.g. the GSM 1800 MHz signal). Therefore, the receiver 100 is capable of rejecting the GSM 900 MHz signal and extracting the GSM 1800 MHz signal from the received RF signal, and capable of rejecting the GSM 1800 MHz and extracting the GSM 900 MHz from the received RF signal. In another example, regarding the GSM 1800 MHz signal as an image signal of the CDMA IS-95 1900 MHz signal and regarding the CDMA IS-95 1900 MHz as an image signal of the GSM 1800 MHz signal, the receiver 100 can be used to collect both the GSM 1800 MHz and CDMA 1900 MHz signals concurrently.

Figure 4:
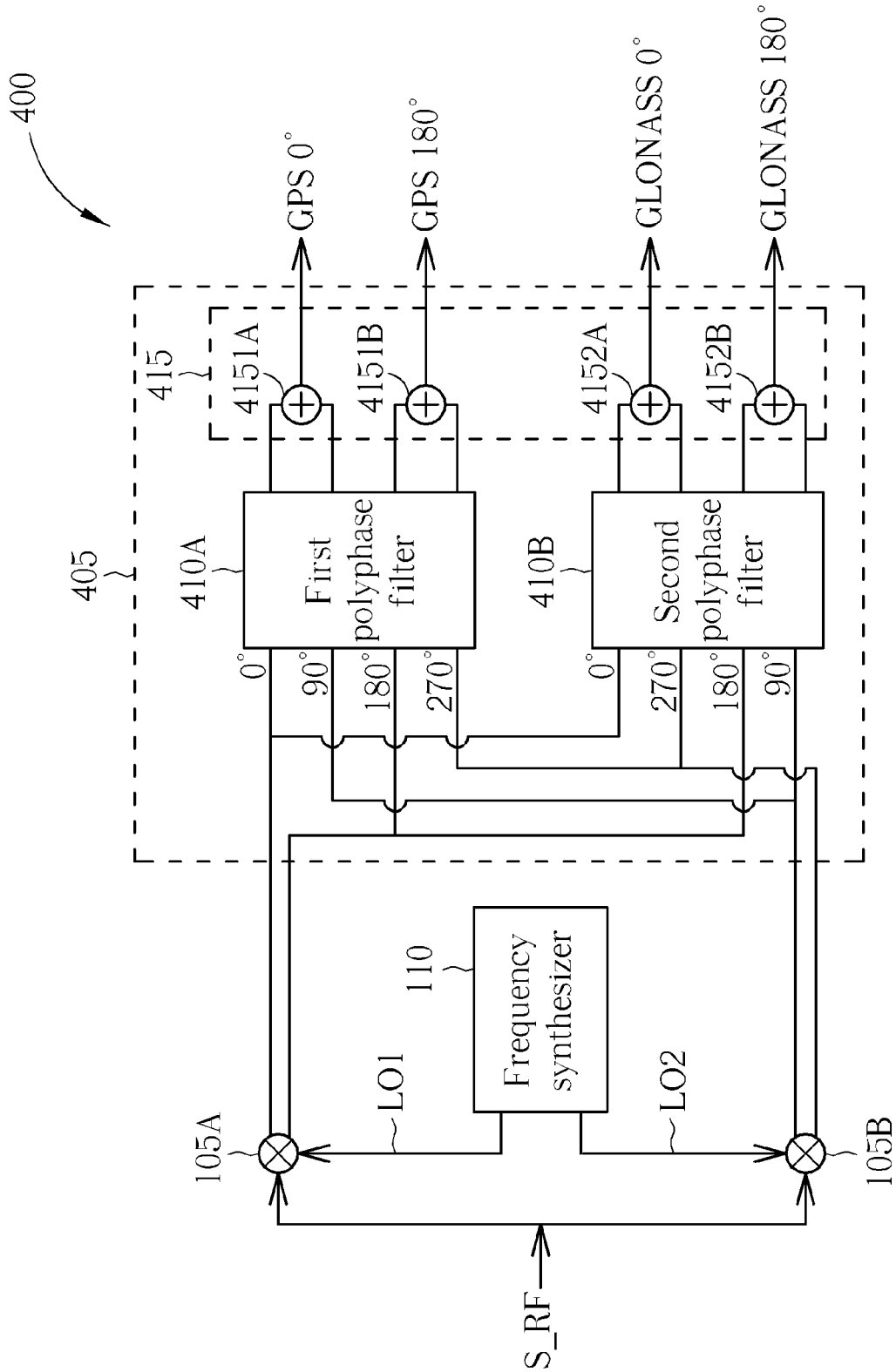
FIG. 4 is a diagram of a receiver according to a second embodiment of the present invention.

In another embodiment, the operations of phase shifting and signal calculation can be implemented by a complex filter such as a polyphase circuit. Please refer to FIG. 4. FIG. 4 is a diagram of a receiver 400 according to another embodiment of the present invention. The receiver 400 comprises mixers 105A-105B, a frequency synthesizer 110, and a processing circuit 405 comprising a first polyphase filter 410A and a second polyphase filter 410B. The input RF signal S_RF is first down-converted by a first oscillating signal LO1 and a second oscillating signal LO2 substantially orthogonal to each other. The mixing operation of the mixer 105A maps the desired signal (e.g. the GPS signal) and the image/undesired signal (e.g. the GLONASS signal) embedded in the input RF signal S_RF in different sequences (for example, in clockwise and counterclockwise sequences, respectively) for the polyphase filter 410A. The mixing operation of the mixer 105B maps the desired signal (e.g. the GLONASS signal) and the image/undesired signal (e.g. the GPS signal) embedded in the input RF signal S_RF in different sequences (for example, in clockwise and counterclockwise sequences, respectively) for the polyphase filter 410B. The first polyphase filter 410A coupled to the mixers 105A-105B is arranged to reject/null the GLONASS signal for extracting/passing the GPS signal from the first and second low-frequency signals. The outputs of the first polyphase filter 410A are GPS signals having 45 degrees, 135 degrees, 225 degrees and 315 degrees, respectively. The second polyphase filter 410B coupled to the mixers 105A-105B is arranged to reject/null the GPS signal for extracting/passing the GLONASS signal from the first and second low-frequency signals. The outputs of the second polyphase filter 410B are GLONASS signals having 45 degrees, 135 degrees, 225 degrees and 315 degrees, respectively. The processing circuit 405 further comprises a processing unit 415 coupled to the filters 410A-410B, and the processing unit 415 is arranged to perform additions on the outputs of the filters 410A-410B in order to strengthen the amplitude of the GPS signals and the GLONASS signals.

Figure 5:
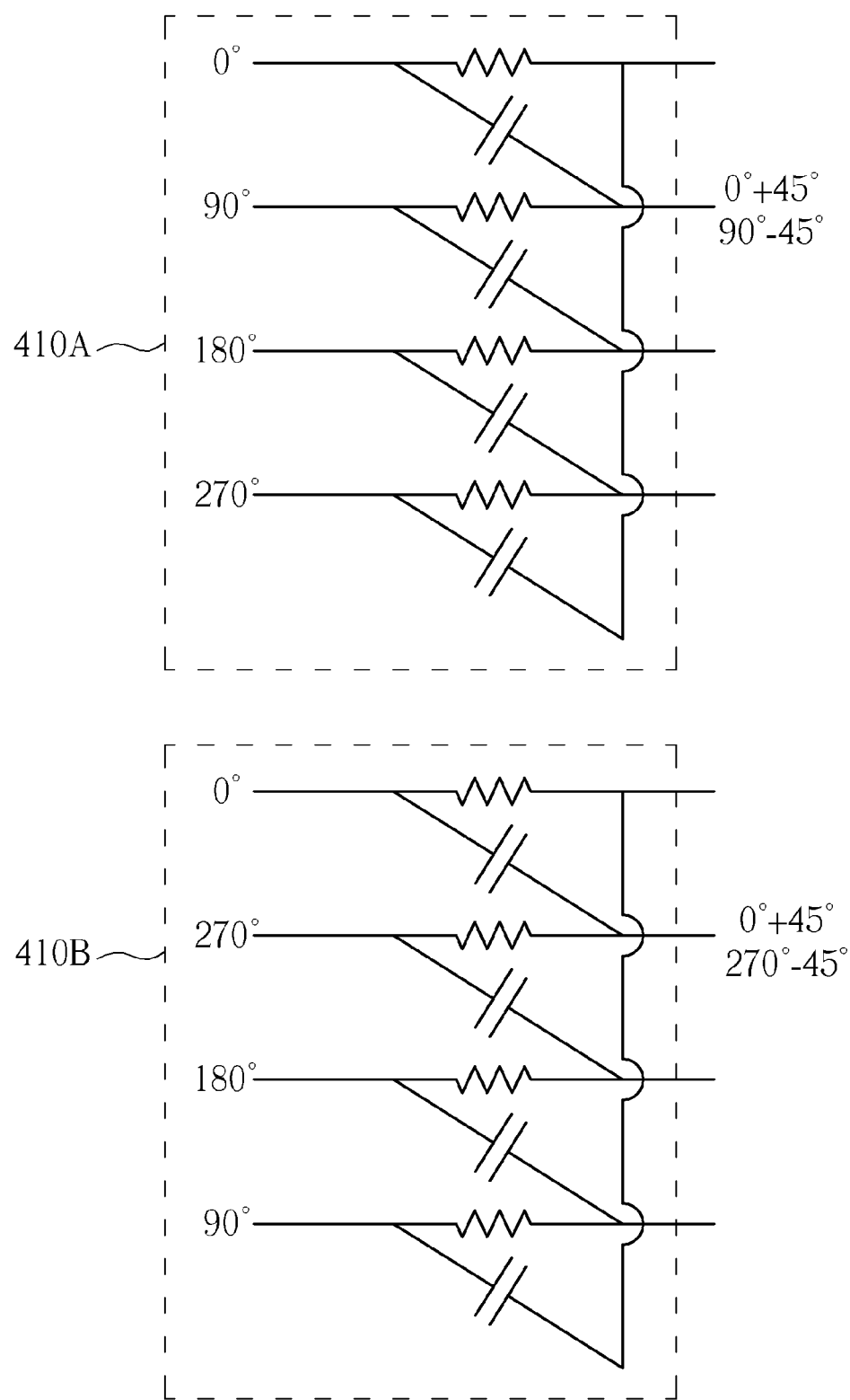
FIG. 5 is a diagram of the first and second polyphase filters as shown in FIG. 4.
Figure 6A:
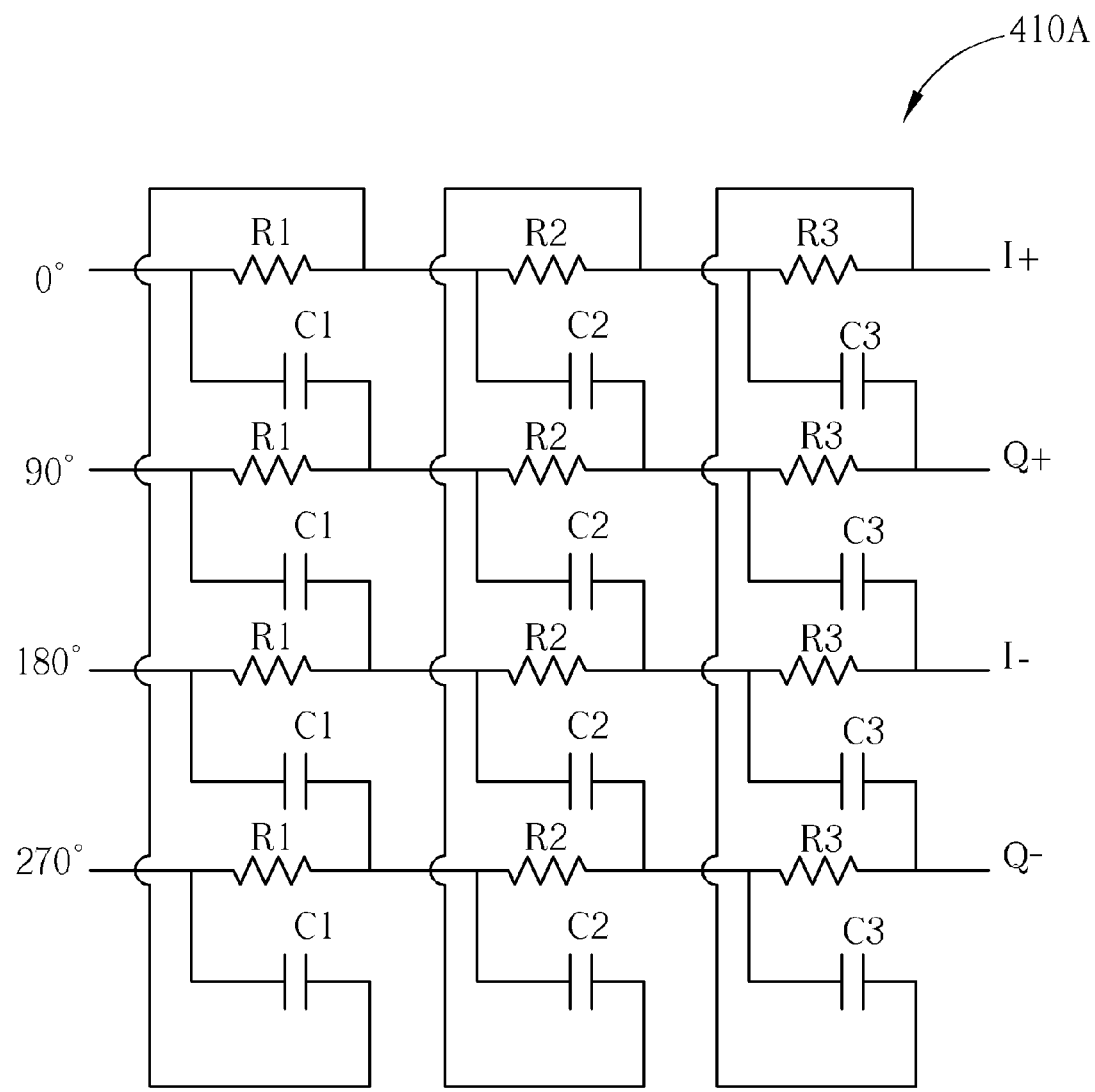
FIGS. 6A-6B are diagrams illustrating the circuit elements included within the first and second polyphase filters as shown in FIG. 4.
Figure 6B:
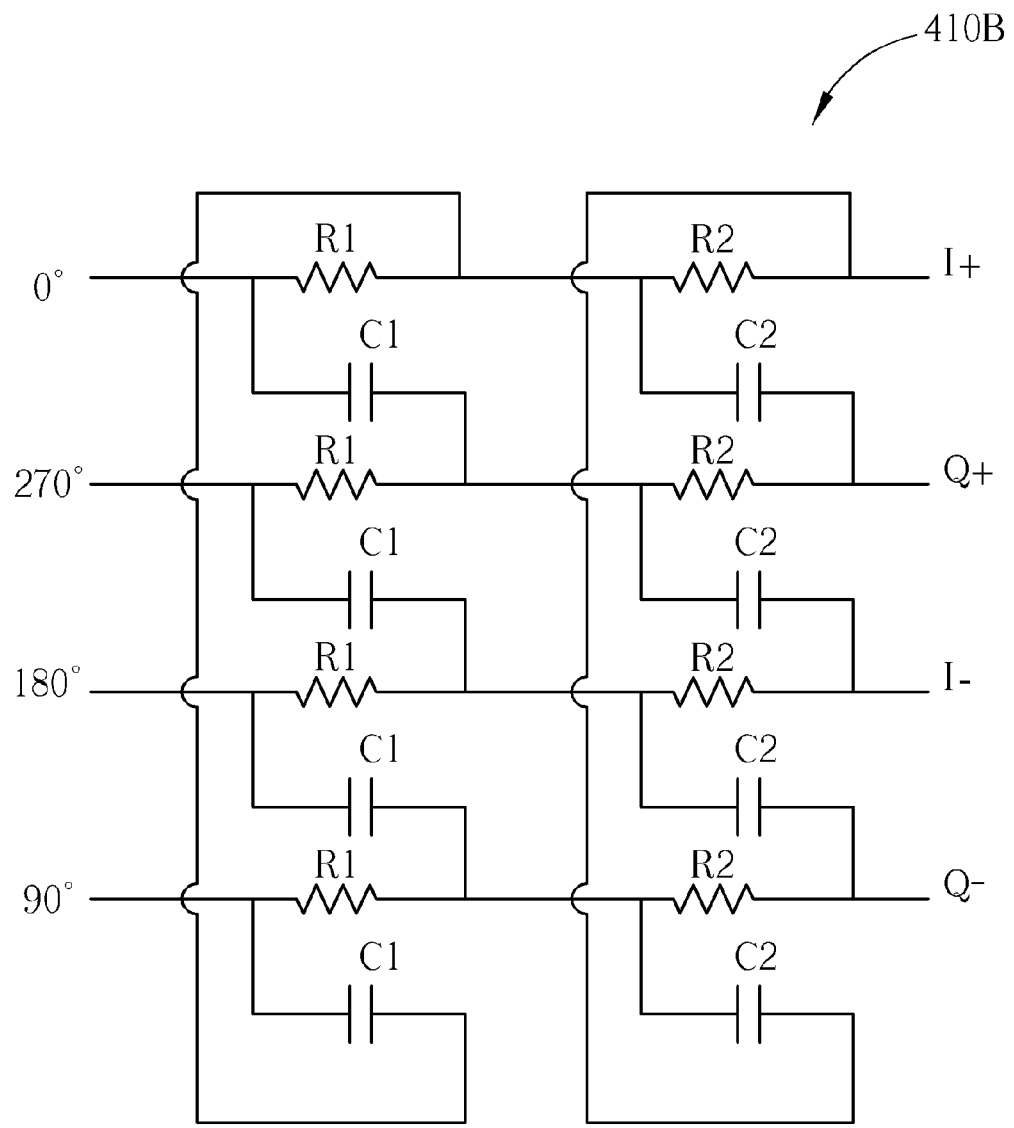

In this embodiment, both of the outputs of the mixers 105A-105B are provided to the first and second polyphase filters 410A-410B. Please refer to FIG. 5, which illustrates a diagram of the first and second polyphase filters 410A-410B as shown in FIG. 4. The inputs of the first polyphase filter 410A are arranged to couple to the outputs of the mixers 105A-105B, as shown in FIG. 4. The inputs of the second polyphase filter 410B are arranged to couple to the outputs of the mixers 105A-105B, as shown in FIG. 4. As shown in FIG. 5, the operations of the first and second polyphase filters 410A-410B are utilized for shifting phases of any two adjacent inputs by +45 degrees and −45 degrees to the output. Thus, the first and second polyphase filters 410A-410B can respectively generate a first set of phase-shifted signals and a second set of phase-shifted signals, where the GPS signal is regarded as a desired signal and the GLONASS signal is regarded as an image/undesired signal for the first polyphase filter 410A while the GPS signal is regarded as a undesired/image signal and the GLONASS signal is regarded as a desired signal for the second polyphase filter 410B. The first polyphase filter 410A then functions as a notch filter that rejects the GLONASS signal band, and the second polyphase filter 410B then functions as a notch filter that rejects GPS signal band. Adders 4151A-4151B of the processing unit 415 are arranged to generate additions of the first set of phase-shifted signals to strengthen the outputted GPS signal. For example, the adder 4151A adds the GPS signal having amplitude A and 45 degree with the GPS signal having amplitude A and 135 degree to generate a GPS signal having √2*A amplitude and 90 degrees; the adder 4151B adds the GPS signal having amplitude A and 225 degree with the GPS signal having amplitude A and 315 degree to generate a GPS signal having √2*A amplitude and 270 degrees. Adders 4152A-4152B of the processing unit 415 are arranged to generate additions of the second set of phase-shifted signals to strengthen the GLONASS signal. Similarly, the adder 4152A adds the GLONASS signal having amplitude A and 45 degree with the GLONASS signal having amplitude A and 135 degree to generate a GLONASS signal having √2*A amplitude and 90 degrees; the adder 4152B adds the GLONASS signal having amplitude A and 225 degree with the GLONASS signal having amplitude A and 315 degree to generate a GLONASS signal having √2*A amplitude and 270 degrees. Please be noted that the degrees shown in FIG. 4 represent relative degrees, not absolute degrees. For example, the GPS 0° and GPS 180° illustrated at outputs of the adders 4151A-4151B represents that the two output GPS signals have 180 degree phase difference. In this embodiment, for increasing signal rejection of the GLONASS signal, the first polyphase filter 410A is implemented using a three-stage polyphase filter as shown in FIG. 6A. This can effectively filter out the GLONASS signal to receive the GPS signal successfully. The second polyphase filter 410B is implemented using a two-stage polyphase filter as shown in FIG. 6B. The two-stage polyphase filter is capable of effectively filtering out the GPS signal to receive the GLONASS signal successfully. The implementations of the polyphase filters described above are merely used for illustrative purposes and are not meant to be limitations of the present invention.

It should be noted that through appropriate phase shifting and signal calculation (addition or subtraction), the receivers of the above embodiments can individually collect different communication signals located in different frequency ranges or specified by different frequency ranges without mode switching. For example, for receiving the GPS signal, the receivers 100 and 400 can directly collect the GPS signal without switching from a reception mode (i.e. the GLONASS reception mode or others) to the GPS reception mode. Similarly, for receiving the GLONASS signal, the receivers 100 and 400 can directly collect the GLONASS signal without switching from a reception mode to the GLONASS reception mode. In addition, each of the receivers 100 and 400 includes one set of signal reception circuit elements instead of two sets of signal reception circuit elements for respectively collecting the GPS and GLONASS signals. Moreover, the signals to be received/collected by the receivers 100 and 400 are not limited to the GPS and GLONASS signals. The receivers 100 and 400 can be applied to collect other kinds of signals, such as a Galileo signal or another kind of satellite signal, or GSM signal or another kind of communication signal. This also follows the spirit of the present invention.

Figure 7:
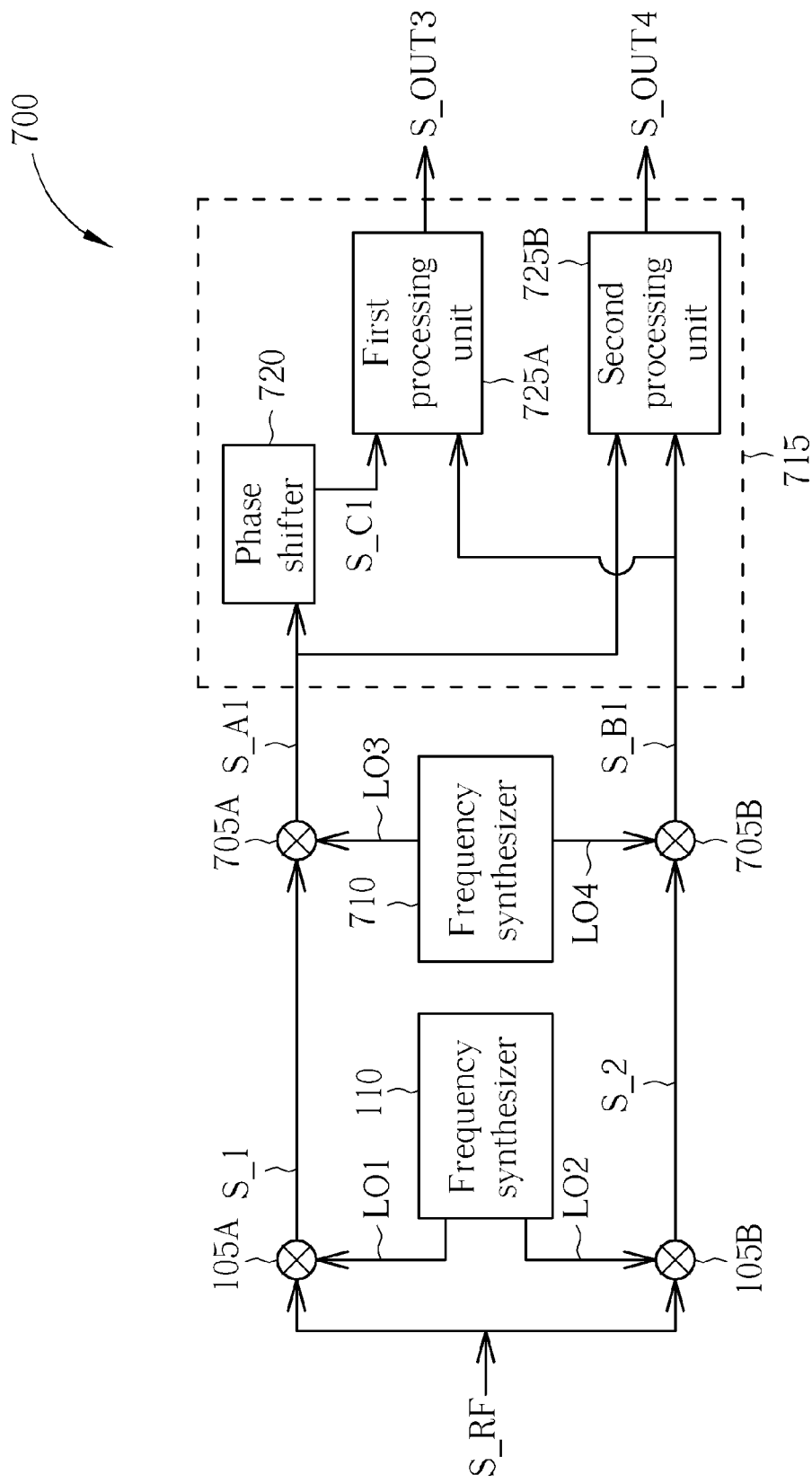
FIG. 7 is a diagram of a receiver according to a third embodiment of the present invention.

Please refer to FIG. 7. FIG. 7 is a diagram of a receiver 700 according to a third embodiment of the present invention. The receiver 700 comprises the mixers 105A-105B, the frequency synthesizer 110, mixers 705A-705B, a frequency synthesizer 710, and a processing circuit 715. The processing circuit 715 comprises a phase shifter 720, a first processing unit 725A, and a second processing unit 725B. The operations and functions of the mixers 105A-105B and the frequency synthesizer 110 are similar to those circuit elements having the same names and reference numerals as shown in FIG. 1. Further description is omitted for brevity. In particular, the mixers 705A-705B are respectively arranged to perform down-conversion on the first and second low-frequency signals to generate the first and second converted low-frequency signals S_A1 and S_B1 according to the third and fourth local oscillating signals LO3 and LO4. The third and fourth local oscillating signals LO3 and LO4 are provided by the frequency synthesizer 710. The oscillation frequency $\omega_1$ of the frequency synthesizer 110 is different from the oscillation frequency $\omega_2$ of the frequency synthesizer 710. In addition, the third and fourth local oscillating signals LO3 and LO4 are, for example, the sine wave sin $\omega_2$t and the cosine wave cos $\omega_2$t respectively. The third oscillating signal LO3 is substantially orthogonal to the fourth oscillating signal LO4. Please note that the low-frequency signals S_1 and S_2 are indicative of signals having frequencies lower than that of the input RF signal S_RF. That is, the low-frequency signals S_1 and S_2 can be intermediate frequency signals or extremely low frequency signals. The name 'low-frequency' is merely used to explain that the signals S_1 and S_2 are frequency-converted signals from the signal S_RF having a higher frequency. This is not meant to be a limitation of the present invention.

In addition, the phase shifter 720 is arranged to perform phase shifting (180 degree phase shifting, i.e. signal inversion) on one signal selected from the converted low-frequency signals S_A1 and S_B1, and then a corresponding signal calculation is performed according to the selection result to reject image signals for successfully extracting desired signals. In this embodiment, the phase shifter 720 is utilized for performing phase shifting on the converted low-frequency signal S_A1 to generate a phase-shifted low-frequency signal S_C1. The desired output signals S_OUT3 (e.g. the GLONASS signal) and S_OUT4 (e.g. the GPS signal) can be generated based on the signal calculation (e.g. summation) result of the low-frequency signals S_A1, S_B1, and S_C1.

Figure 8:
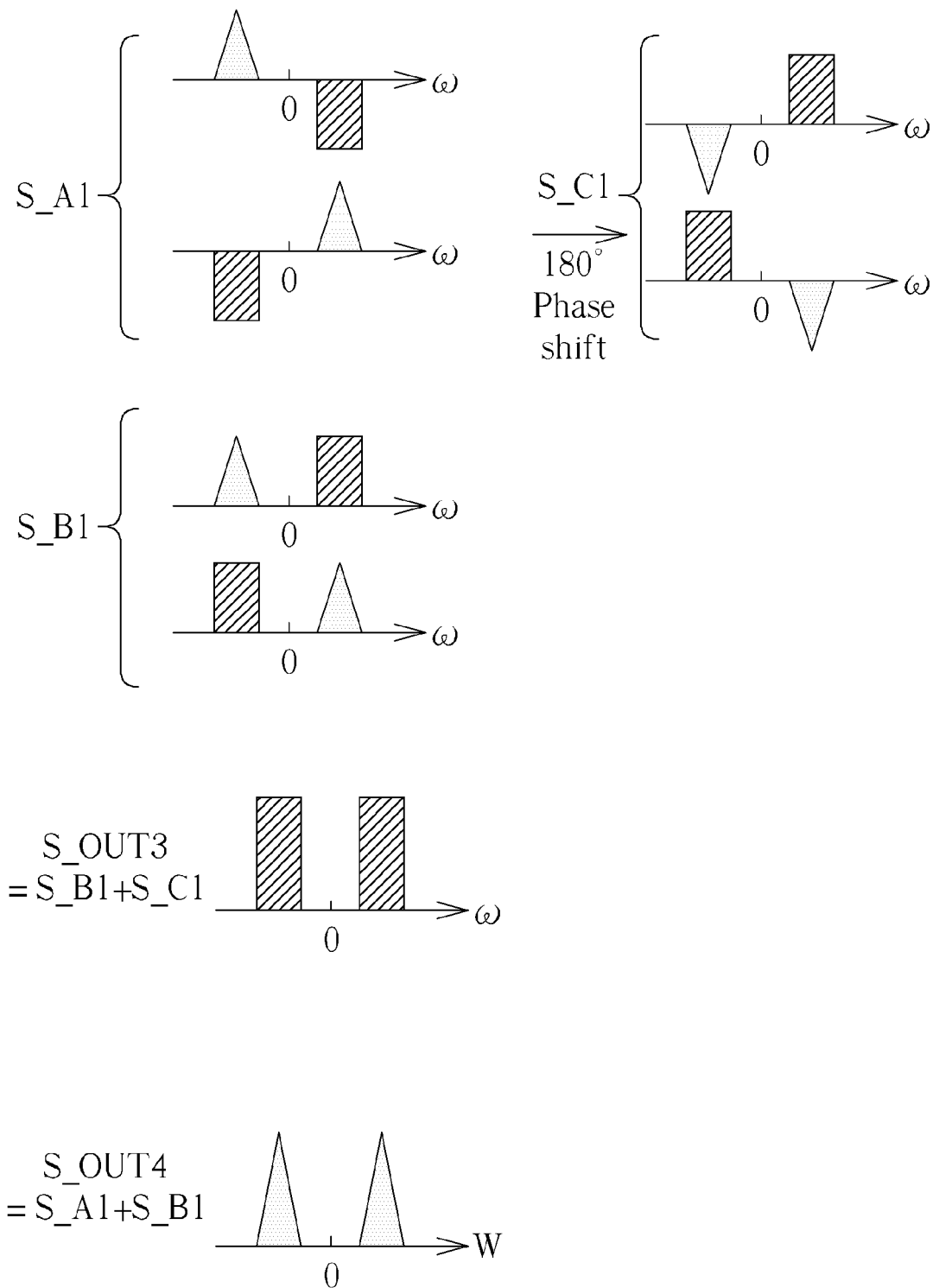
FIG. 8 is a diagram showing Fourier spectrums plots of the signals S_A1, S_B1, S_C1, S_OUT3, and S_OUT4 as shown in FIG. 7.

Please refer to FIG. 8 in conjunction with FIG. 7. FIG. 8 illustrates a diagram showing Fourier spectrum plots of the signals S_A1, S_B1, S_C1, S_OUT3, and S_OUT4 as shown in FIG. 7. As shown in FIG. 8, after the processing of the mixer 705A, a low-frequency signal, such as the signal S_A1 comprising the GPS and GLONASS signals, is generated. It should be noted that the signal S_A1 is represented by two-part signals for illustrative purposes. However, this is not meant to be a limitation of the present invention. Similarly, after the processing of the mixer 705B, a low-frequency signal, such as the signal S_B1 comprising the GPS and GLONASS signals, is generated. For separating the GPS signal from the GLONASS signal, the first step is to use the phase shifter 720 to perform a 180 degree phase shifting operation on one of the signals S_A1 and S_B1. As illustrated above, the phase shifter 720 is arranged to perform the 180 degree phase shifting operation on the signal S_A1 to generate the signal S_C1. The phase-shifted signal S_C1 is also comprised by the GPS and GLONASS signals. One difference between the Fourier spectrums of the signals S_A1 and S_C1 is that the distributions of the Fourier spectrums components of the GLONASS and GPS signals comprised by the signal S_A1 are different from those of the signal S_C1.

The second step for generating the GLONASS signal is to add the signals S_B1 and S_C1. As shown in FIG. 8, the Fourier spectrum of the phase-shifted signal S_C1 comprises the GLONASS signal including the Fourier spectrum components having positive values and the GPS signal including the Fourier spectrum components having negative values. The Fourier spectrum of the signal S_B1 comprises the GLONASS signal including the Fourier spectrum components having positive values and the GPS signal including the Fourier spectrum components having positive values. The first processing unit 725A, which is used as an adder, is utilized for adding signal components of the phase shifted signal S_C1 to those of the signal S_B1 to generate the output signal S_OUT3. Therefore, by signal summation, on the Fourier spectrum, the spectrum components of the GPS signal included within the signal S_B1 neutralize those of the GPS signal included within the signal S_C1. The remaining components in the signal summation result (i.e. the output signal S_OUT3) are all associated with the GLONASS signal. Thus, the output signal S_OUT3 can be used for retrieving GLONASS data. That is, the receiver 700 successfully collects the GLONASS signal from the received RF signal by rejecting the GPS signal. For generating the GPS signal, the second processing unit 725B is also used as an adder to add signal components of the signal S_A1 to those of the signal S_B1 to generate the output signal S_OUT4. By signal summation, the Fourier spectrum components of the GLONASS signal included within the signal S_A1 neutralize those of the GLONASS signal included within the signal S_B1. The remaining components in the signal summation result (i.e. the output signal S_OUT4) are all associated with the GPS signal. Thus, the output signal S_OUT2 can be used for retrieving GPS data. That is, the receiver 700 successfully collects the GPS signal from the received RF signal by rejecting the GLONASS signal.

For GPS signal reception, the GLONASS signal is regarded as an image signal of the GPS signal. For GLONASS signal reception, the GPS signal is regarded as an image signal of the GLONASS signal. Therefore, by performing 180 degree phase shifting and signal calculation (summation) for rejecting image signals, the receiver 700 of this embodiment is capable of rejecting the GLONASS signal when collecting the GPS signal, and capable of rejecting the GPS signal when collecting the GLONASS signal. Similarly, the receiver 700 can be implemented to collect GSM 900 and 1800 MHz signals at the outputs S_OUT3 and S_OUT4 by regarding the GSM 900 MHz signal as an image signal of the GSM 1800 MHz signal and regarding the GSM 1800 MHz signal as an image signal of the GSM 900 MHz signal. Moreover, GSM 1800 MHz and CDMA 1900 MHz signals can be collected concurrently at the outputs S_OUT3 and S_OUT4 as well by regarding the GSM 1800 MHz signal as an image signal of the CDMA IS-95 1900 MHz signal and regarding the CDMA IS-95 1900 MHz as an image signal of the GSM 1800 MHz signal.

Additionally, in another embodiment, the phase shifter 720 as shown in FIG. 7 may be arranged to couple to the mixer 705B instead of the mixer 705A. That is, in another embodiment, the phase shifter 720 can be used to perform 180 degree phase shifting on the converted signal S_B1. Due to this modification, operations of the first and second processing units 725A and 725B are correspondingly modified to perform corresponding signal calculation (e.g. subtraction or summation) so as to reject undesired signals and successfully collect desired signals. Further description is not detailed for brevity.

Briefly summarized, the receiver 100/400/700 is capable of collecting signals of multiple different communication systems without disposing individual receiver front-end circuitry and reception mode for each communication system. Therefore the circuit cost is decreased.

Those skilled in the art will readily observe that numerous modifications and alterations of the device and method may be made while retaining the teachings of the invention.

What is claimed is:

1. A receiver for receiving a first communication signal and a second communication signal, comprising:
   a first mixer, for down-converting an input radio-frequency signal comprising the first communication signal and the second communication signal into a first low-frequency signal according to a first local oscillating signal;
   a second mixer, for down-converting the input radio-frequency signal into a second low-frequency signal according to a second local oscillating signal; and
   a processing circuit, coupled to the first mixer and the second mixer, for generating at least one phase-shifted low-frequency signal according to at least the first low-frequency signal, for extracting signal components of the first communication signal by rejecting signal components of the second communication signal according to the second low-frequency signal and the at least one phase-shifted low-frequency signal, and for extracting signal components of the second communication signal by rejecting signal components of the first communication signal according to the second low-frequency signal and the at least one phase-shifted low-frequency signal;
   wherein the first communication signal is situated in a first frequency range different from a second frequency range in which the second communication signal is situated, and the processing circuit comprises:
   a first polyphase filter, coupled to the first and second mixer, for receiving the first and second low-frequency signals, and for rejecting the second communication signal and extracting the first communication signal according to the first and second low-frequency signals; and
   a second polyphase filter, coupled to the first and second mixer, for receiving the first and second low-frequency signals, and for rejecting the first communication signal and extracting the second communication signal according to the first and second low-frequency signals.

2. The receiver of claim 1, further comprising:
   a synthesizer, coupled to the first mixer and the second mixer, for generating both the first and second oscillating signals, wherein the first and second oscillating signals are orthogonal to each other, and frequency of the first and second oscillating signals is between frequency ranges of the first and second GNSS signals.

3. The receiver of claim 1, wherein the processing circuit further comprises a processing unit, coupled to the first and second polyphase filters, for generating an addition result in accordance with the outputs of the first polyphase filter, and for generating an addition result in accordance with the outputs of the second polyphase filter.

4. A method for receiving a first communication signal and a second communication signal, comprising:
   down-converting an input radio-frequency signal comprising the first communication signal and the second communication signal into a first low-frequency signal according to a first local oscillating signal;

down-converting the input radio-frequency signal into a second low-frequency signal according to a second local oscillating signal;

generating at least one phase-shifted low-frequency signal according to at least the first low-frequency signal;

using a first polyphase filter to receive the at least one phase-shifted low-frequency signal and the second low-frequency signal, and to extract signal components of the first communication signal by rejecting signal components of the second communication signal according to the second low-frequency signal and the at least one phase-shifted low-frequency signal; and using a second polyphase filter to receive the at least one phase-shifted low-frequency signal and the second low-frequency signal, and to extract signal components of the second communication signal by rejecting signal components of the first communication signal according to the second low-frequency signal and the at least one phase-shifted low-frequency signal;

wherein the first communication signal is situated in a first frequency range different from a second frequency range in which the second communication signal is situated.

5. The method of claim 4, wherein the first and second oscillating signals are orthogonal to each other, and a frequency of the first and second oscillating signals is between frequency ranges of the first and second GNSS signals.

6. A receiver for receiving a first GNSS signal and a second GNSS signal, comprising:

a first mixer, for down-converting an input radio-frequency signal comprising the first GNSS signal and the second GNSS signal into a first low-frequency signal according to a first local oscillating signal;

a second mixer, for down-converting the input radio-frequency signal into a second low-frequency signal according to a second local oscillating signal; and a processing circuit, coupled to the first mixer and the second mixer, for generating at least one phase-shifted low-frequency signal according to at least the first low-frequency signal, for extracting signal components of the first GNSS signal by rejecting signal components of the second GNSS signal according to the second low-frequency signal and the at least one phase-shifted low-frequency signal, and for extracting signal components of the second GNSS signal by rejecting signal components of the first GNSS signal according to the second low-frequency signal and the at least one phase-shifted low-frequency signal;

wherein the first GNSS signal is situated in a first frequency range different from a second frequency range in which the second GNSS signal is situated, and the processing circuit comprises:

a first polyphase filter, coupled to the first and second mixer, for receiving the second low-frequency signal and the at least one phase-shifted low-frequency signal, and for rejecting the second GNSS signal and extracting the first GNSS signal according to the second low-frequency signal and the at least one phase-shifted low-frequency signal; and a second polyphase filter, coupled to the first and second mixer, for receiving the second low-frequency signal and the at least one phase-shifted low-frequency signal, and for rejecting the first GNSS signal and extracting the second GNSS signal according to the second low-frequency signal and the at least one phase-shifted low-frequency signal.

* * * * *